Oct. 8, 1957
G. J. BACSIK ET AL
2,809,153
PROCESS FOR PRODUCING LOW-SEDIMENT FUEL
Filed July 14, 1952
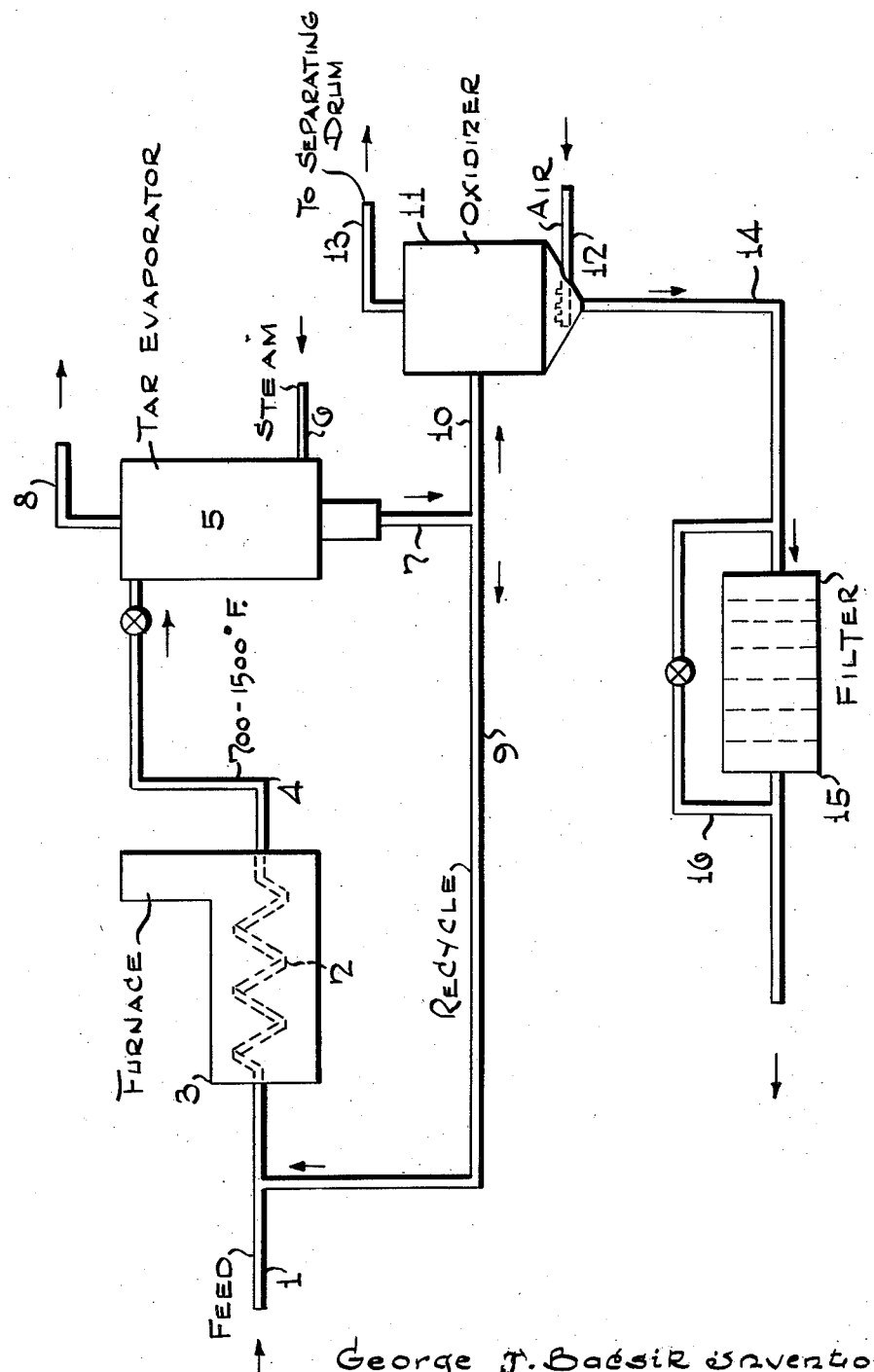
George J. Bacsik
Wilfred O. Taff
By W. O. Heilman Attorney 2,809,153
Patented Oct. 8, 1957

2,809,153

PROCESS FOR PRODUCING LOW-SEDIMENT FUEL

George J. Bacsik, Metuchen, and Wilfred O. Taff, Cranford, N. J., assignors to Esso Research and Engineering Company, a corporation of Delaware Application July 14, 1952, Serial No. 298,772

5 Claims. (Cl. 196—50)

The present invention relates to a method for stabilizing fuel oils and is more particularly concerned with the preventing of sediment deposition in cracked fuel oils so that visbreaking operations can be carried out on crude residua at increased severities while producing merchantable fuel oils therefrom.

It is highly desirable to produce the maximum yields of distillate products from crude residua at all times. This is accomplished by cracking at maximum severity as limited by plant operability. However, it has not been found practicable to so operate because the fuel oils thus produced contain an exceptionally large amount of sediment. While this sediment can be removed from a cracked fuel oil by filtering and the oil thus treated found to meet current specifications, it has been found that the oil tends to form more sediment during storage and fails to meet the specification requirement for sediment by the time it reaches the ultimate consumer. This difficulty is particularly noticeable when the cracking severities are increased to achieve the above aims.

According to the present invention, the above difficulties are overcome and the cracking severities can be increased and the amount of sediment produced initially and after storage is decreased provided the resulting fuel oil, prior to removal of sediment, is subjected to an oxidation treatment for a time sufficient to stabilize the oil. The oxidation may be carried out in any suitable manner, for example, by blowing an excess of oxygen-containing gas, such as air, through the oil. It is also possible to carry out the oxidation by passing the oil, under superatmospheric pressure, if desired, through a heating coil and then mixing the oil with air before, and/or during, and/or after the oil is passed through the coil. Pressures, if used, may range from atmospheric to about those used in the cracking operations, preferably at essentially atmospheric pressure.

The time of blowing necessary for successful stabilization of the oil varies inversely with the temperature and also depends a great deal on the properties of the residual oil fed to the visbreaker. The presence of oxidation catalysts, such as various heavy metals or their oxides, and organic substances capable of forming peroxides under the conditions of blowing materially shortens the blowing time. The proper time for a given temperature must be ascertained for different types of fuels and may vary from 1 minute to 12 or more hours, preferably as short a time as possible. The upper practical limit for the blowing temperature is determined by the character of the visbroken tar. The temperature should not exceed the level at which measurable amounts of additional sediment would be formed in the absence of air during the time that will be required for the air blowing step. In order to have a controllable process, temperature will usually not exceed 750° F. as a practical limit.

The oxidation products should be removed from the oil as soon as possible after the oxidation. Removal is conveniently accomplished by filtration in conjunction with, if desired, a solvent extraction or acid treating process. Certain contaminants of the oil may become substantially insoluble in the oil as a result of the oxidation and if allowed to remain in the oil, they will act as catalysts and contribute to the further instability of the oil.

In order to make the invention more clearly understood, there is shown in the accompanying drawing one means for carrying the same into practical effect.

Referring, therefore, to the drawing, a vacuum reduced crude oil is introduced into the system through feed line 1 to tubes 2 in viscosity-breaking furnace 3. The cracked vapors from tubes 2 are passed by line 4 to tar evaporator 5, which may be of any conventional design such as a disc and donut tower. Steam may be introduced through line 6 for stripping. The pressure in evaporator 5 may be maintained over a wide range, for example, from less than atmospheric to 300 p. s. i. g. Separation of vapors and liquid residue is thus effected to produce vapors containing the desired cracked products. The liquid residue or tar separated in the evaporator is withdrawn therefrom through line 7 while the vapor fractions are taken overhead through line 8 and passed to other units for further processing.

The liquid residue or tar may be recycled to the feed through line 9. The product liquid residue is withdrawn by line 10 and is passed to oxidizing unit 11, which is conveniently a tank into which air or oxygen is bubbled through line 12. Vapors and gases are withdrawn from the oxidizer 11 through line 13 and may be treated in conventional manner to recover hydrocarbon vapors. Oxidized oil is then passed by line 14 through filter press 15 for removal of its sediment content. The filter press is so connected that it can be by-passed through line 16. A plurality of filters are employed (not shown) so that one may be cleaned and prepared while another is in use.

The operation of this apparatus and process will be described in connection with a specific example. The fuel oils that are formed in ordinary distillation processes will vary in quality with the type of crude and with market conditions. As an approximation, it may be said that these fuel oils will be within the limits of 10°–25° API gravity and within a viscosity range of 25–600 seconds Furol at 122° F. The lowest acceptable grade of fuel oil must have a viscosity of 150–300 seconds Furol at 122° F. and must have a sediment content, on extraction with 90% commercial benzol, of 0.25 weight percent or less. The lowest commercial grade of fuel oil is Bunker C (U. S. Government specification) and has a viscosity of 300 seconds Furol at 122° F. All commercial distillation of naphthenic base crude oil produces a residuum suitable for this type of fuel oil.

The process of this invention permits increasing the severity of the cracking taking place in the viscosity breaking furnace. The liquid residuum is oxidized and the oxidized products are immediately removed. In accordance with this invention, the feed may comprise from about 2–50% of the total oil and has an API gravity of about 0 to 20° API and an initial boiling point of about 900° F. or higher. This material is passed to viscosity breaking furnace 3. Such a cracking unit is usually operated at a coil outlet temperature from 850° to 950° F. and a pressure from 200 to 1000 p. s. i. g. However, in order to decrease the yield of stripped tar or fuel oil, it is desirable to more severally crack this material while maintaining merchantable quality fuels. Therefore, according to this invention, the coil outlet temperatures in the visbreaker are increased to 900° to 1050° F. and essentially the same pressure as discussed above. As a result of the increased cracking severities, the sediment content of the stripped tar obtained in tar evaporator 5 is increased beyond specifications. However, further according to this invention, the stripped tar is subjected to oxidation with air or other oxygen-containing gas in oxidizer 11 for a period from 1 minute to 12 hours, preferably as short a time as possible. The oxidation is carried out at temperatures above 200° F. and below incipient cracking temperatures of 750° F., preferably between 300° and 600° F. The oxidized oil is then passed immediately through filter 15 when the solid material produced by the oxidation is removed.

As an example, a pitch of the following characteristics

| | | |
|---|---|---|
| Gravity | ° API | 9.6 |
| Furol vis. at 210° F | sec | 990 |
| Sediment | wt. percent | 0.1 |
| Naphtha insoluble | do | 0.1 |
| Conradson carbon | do | 21 | was visbroken at 1050° F. at 9% conversion to gasoline. When the tar boiling above 650° F. was blended to a Furol vis. at 122° F. of 175 sec. with a low boiling flux, the resultant fuel showed 14 wt. percent sediment. This sediment content could be reduced to less than 0.25 wt. percent, a satisfactory level, by filtration but additional sediment formed on storage. Upon subjecting this oil to oxidation by passing oxygen through the oil for 5 hours at a temperature of 205° F. and filtering, the sediment was reduced to 0.18 wt. percent. This oil thus was able to meet sediment specifications of 0.25 wt. percent and represented excellent quality fuel oil. Furthermore, the oil so produced was stable as demonstrated by the fact that after an accelerated oxidation test simulating long time storage, the oil was still within the specification limit showing only 0.21 wt. percent sediment. The sediment contents of the oil above reported were obtained by a laboratory method which has been found to correlate accurately the tendency of fuel oils to settle. This method involves filtering the undiluted but heated oil through an asbestos mat in a special steam jacketed filter funnel, washing the residue free of oil with a high flash point paraffinic naphtha, drying and weighing. This method is known as the hot filtration method and is described in the Analytical Edition of "Industrial and Engineering Chemistry," vol. 10, page 678, December 15, 1938.

While there has been described and illustrated one embodiment of this invention with considerable particularity, it is not intended to be limited thereto. It will be evident that various changes may be made in the details thereof, if desired, without departing from its principal features and characteristics. For example, the filter used in separating the sediment after oxidation may be a filter press as shown or it may be a sand bed, a precoat filter, a ceramic filter employing back wash or any other type of filter known to the prior art.

The nature of the present invention having been thus fully set forth and specific examples of the same given, what is claimed as new and useful and desired to be secured by Letters Patent is:

1. Process for the production of a high quality stable fuel oil from a residual oil which comprises visbreaking said residual oil at a temperature in the range between about 900° F. to 1050° F. at a pressure in the range from about 200 to 1000 lbs. per sq. in. gauge, separating from the visbroken product hydrocarbon constituents boiling in the fuel oil boiling range, thereafter oxidizing said fuel oil fraction at a temperature in the range between 200 and 750° F. and thereafter separating dispersed solid particles from said oxidized oil.

2. Process as defined by claim 1 wherein said residuum has a gravity below about 20° API.

3. Process for producing fuel oil which comprises visbreaking a reduced crude at temperatures between 900° and 1050° F. and under pressures between 200 and 1000 pounds per square inch gauge, separating vapors from cracked liquid residue, subjecting the liquid residue to oxidation at temperatures between 200° and 750° F., for a time sufficient to stabilize the oil, and filtering the oxidized products.

4. Process for producing fuel oil which comprises visbreaking a reduced crude at 1050° F. under 1000 pounds per square inch gauge, separating vapors from liquid residue, air blowing the liquid residue at a temperature of 300–600° F. for 1 minute to 12 hours, and filtering the airblown oil.

5. Process for producing fuel oil which comprises visbreaking a reduced crude at 1050° F. under 1000 lbs. per sq. in. with 9% conversion to gasoline, separating vapors from liquid residue, blowing the liquid residue with oxygen for five hours at 205° F. and filtering the blown oil.

References Cited in the file of this patent

UNITED STATES PATENTS

| | | |
|---|---|---|
| 1,663,523 | Reid | Mar. 20, 1928 |
| 1,956,286 | Haylett | Apr. 24, 1934 |
| 1,988,753 | Shaffer | Jan. 22, 1935 |
| 2,070,627 | Schoemaker et al. | Feb. 16, 1937 |
| 2,282,514 | Fischer et al. | May 12, 1942 |
| 2,305,440 | Noel | Dec. 15, 1942 |
| 2,666,022 | Johnson | Jan. 12, 1954 |
| 2,696,458 | Strickland | Dec. 7, 1954 |
| 2,733,192 | Sage | Jan. 31, 1956 |

OTHER REFERENCES

Schmidt: "Fuel Oil Manual," page 119, Industrial Press. Copyright 1951.